(12) United States Patent
Sridhar et al.

(10) Patent No.: US 12,395,434 B2
(45) Date of Patent: Aug. 19, 2025

(54) SYSTEM AND METHOD FOR TRAFFIC FLOW ACCELERATION

(71) Applicant: Sandvine Corporation, Waterloo (CA)

(72) Inventors: Kamakshi Sridhar, Plano, TX (US); Tushar Mulkar, Karnataka (IN); Akash Manchanhalli Suresh, Bangalore (IN); Nilanjan Sarkar, Karnataka (IN)

( * ) Notice: Subject to any disclaimer, the term of this patent is extended or adjusted under 35 U.S.C. 154(b) by 19 days.

(21) Appl. No.: 17/829,898

(22) Filed: Jun. 1, 2022

(65) Prior Publication Data
US 2023/0396547 A1    Dec. 7, 2023

(51) Int. Cl.
*H04L 47/125*    (2022.01)
*H04L 43/0829*   (2022.01)
(Continued)

(52) U.S. Cl.
CPC ........ *H04L 47/125* (2013.01); *H04L 43/0829* (2013.01); *H04L 47/10* (2013.01); *H04L 47/24* (2013.01)

(58) Field of Classification Search
CPC ... H04L 47/125; H04L 43/0829; H04L 47/10; H04L 47/24; H04L 47/30; H04L 49/90; H04W 28/02
See application file for complete search history.

(56) References Cited

U.S. PATENT DOCUMENTS

2005/0239435 A1    10/2005  Ikeda et al.
2014/0140209 A1*   5/2014   Shihada ............ H04W 28/0273
                                                        370/230
(Continued)

OTHER PUBLICATIONS

Allen A D: "Optimal Delivery of Multi-Media Content over Networks", Proceedings / ACM Multimedia 2001, [9th ACM International Conference on Multimedia] : Ottawa, Canada, Sep. 30-Oct. 5, 2001, Assoc. for Computing Machinery, New York, NY, USA, vol. 9, Sep. 30, 2001 (Sep. 30, 2001), pp. 79-88, XP003015176.
(Continued)

*Primary Examiner* — Syed Ali
*Assistant Examiner* — Najeeb Ansari
(74) *Attorney, Agent, or Firm* — Amarok IP Inc.; Neil W. Henderson

(57) ABSTRACT

A method for traffic flow acceleration including: retrieving a Transmission Control Protocol (TCP) User Datagram Protocol (UDP) or Quick UDP Internet Connection (QUIC) traffic flow from the computer network; mapping the traffic flow to a subscriber; determining congestion control parameters associated with the traffic flow; determining subscriber buffer management parameters based on the subscriber and the congestion control parameters; and managing a buffer depth at a subscriber level based on the subscriber buffer management parameters. A system for traffic flow acceleration including: an analysis module configured to retrieve a TCP, UDP or QUIC traffic flow and map the traffic flow to a subscriber; a congestion control module configured to determine congestion control parameters associated with the traffic flow; and a buffer management module configured to determine subscriber buffer management parameters based on the subscriber and the congestion control parameters; and manage a buffer depth at a subscriber level.

12 Claims, 8 Drawing Sheets

(51) Int. Cl.
H04L 47/10 (2022.01)
H04L 47/24 (2022.01)

(56) References Cited

U.S. PATENT DOCUMENTS

| | | | |
|---|---|---|---|
| 2017/0063508 A1* | 3/2017 | Stalley | H04L 43/0864 |
| 2017/0331753 A1 | 11/2017 | Li et al. | |
| 2018/0255117 A1 | 9/2018 | Ljung et al. | |
| 2019/0387434 A1* | 12/2019 | Li | H04L 43/0894 |
| 2020/0053018 A1* | 2/2020 | White | H04L 47/6275 |
| 2020/0236043 A1* | 7/2020 | Sze | H04L 43/0882 |
| 2021/0266261 A1* | 8/2021 | Hosokawa | H04L 47/12 |
| 2023/0056734 A1* | 2/2023 | Choi | H04L 47/283 |
| 2023/0247477 A1* | 8/2023 | Uchino | H04W 28/0278 |
| | | | 370/235 |

OTHER PUBLICATIONS

Extended European Search Report, European Patent Office, on corresponding EP Application No. 23175918.4 dated Oct. 4, 2023.

* cited by examiner

SYSTEM AND METHOD FOR TRAFFIC FLOW ACCELERATION

FIELD

The present disclosure relates generally to computer network traffic. More particularly, the present disclosure relates to a system and method for traffic flow acceleration and in particular, Transmission Control Protocol (TCP) and User Datagram Protocol (UDP) traffic flows.

BACKGROUND

Service Providers, including Internet Service Providers (ISP) as well as content providers, generally try to provide the best Quality of Service (QoS) to the largest number of users given network constraints. As more people access content via online networks and as users increase the amounts of data used, congestion continues to grow. As such, various congestion control strategies have been used to attempt to improve the Quality of Service (QoS) and the Quality of Experience (QoE) to users on the network.

Transmission Control Protocol (TCP) is one of the main protocols used for online communication. It is a defined standard that is generally used to establish and maintain a network connection by which applications can exchange data over the Internet. Many Internet applications rely on TCP to deliver data to the users of the network. TCP is intended to provide a reliable and error checked traffic stream between a client and a server. User Datagram Protocol (UDP), similarly to TCP is another protocol used for online communication, particularly for more time-sensitive transmissions.

As connectivity speed and reliability of online access increases, any type of congestion or delay for a user tends to be viewed negatively. As such, there is a need for an improved method and system for TCP and UDP acceleration.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for traffic flow acceleration in a computer network, the method including: retrieving a Transmission Control Protocol (TOP) or User Datagram Protocol (UDP) or Quick UDP Internet Connection (QUIC) traffic flow from the computer network; mapping the traffic flow to a subscriber on the computer network; determining congestion control parameters associated with the traffic flow; determining subscriber buffer management parameters based on the subscriber and the congestion control parameters; and managing a buffer depth at a subscriber level based on the subscriber buffer management parameters.

In some cases, the method may further include controlling subscriber burst activities.

In some cases, controlling subscriber burst activities may include: initializing a burst size for the subscriber; measuring packet loss over a predetermined short interval for the subscriber; comparing the packet loss with the previous interval; and adjusting the burst size for the subscriber based on the comparison.

In some cases, the flow burst size may be reduced if the packet loss is higher in the current interval and increased if the packet loss is less in the current interval.

In some cases, the predetermined short interval may be in a range of hundreds of microseconds.

In some cases, determining the congestion control parameters may include: determining Bottleneck Bandwidth and Round-trip propagation time (BBR) parameters; and determining New Reno congestion mechanism parameters.

In some cases, managing buffer depth may include combining a weighted average of BBR parameters and New Reno parameters.

In some cases, the BBR parameters and New Reno parameters may be incorporated based on the traffic variations on the computer network.

In some cases, the BBR parameters and New Reno parameters may be incorporated based on the traffic control desired by the network operator.

In another aspect, there is provided a system for traffic flow acceleration in a computer network, the system includes: an analysis module configured to retrieve a Transmission Control Protocol (TCP) or User Datagram Protocol (UDP) or QUIC traffic flow from the computer network and map the traffic flow to a subscriber on the computer network; a congestion control module configured to determine congestion control parameters associated with the traffic flow; and a buffer management module configured to determine subscriber buffer management parameters based on the subscriber and the congestion control parameters; and manage a buffer depth at a subscriber level based on the subscriber buffer management parameters.

In some cases, the buffer management module may be further configured to control subscriber burst activities.

In some cases, the analysis module may be configured to: initialize a burst size for the subscriber; measure packet loss over a predetermined short interval for the subscriber; and compare the packet loss with the previous interval; and the buffer management module may be configured to adjust the burst size for the subscriber based on the comparison.

In some cases, the flow burst size may be reduced if the packet loss is higher in the current interval and increased if the packet loss is less in the current interval.

In some cases, the predetermined short interval may be in a range of hundreds of microseconds.

In some cases, the congestion control module may include: a Bottleneck Bandwidth and Round-trip propagation time (BBR) module configured to determine BBR parameters; and a New Reno module configured to determine New Rena congestion mechanism parameters.

In some cases, the buffer management module may be configured to combine a weighted average of BBR parameters and New Reno parameters.

In some cases, the BBR parameters and New Reno parameters may be incorporated based on the traffic variations on the computer network.

In some cases, the BBR parameters and New Reno parameters are incorporated based on the traffic control desired by the network operator.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

In the following, various example systems and methods will be described herein to provide example embodiment(s). It will be understood that no embodiment described below is intended to limit any claimed invention. The claims are not limited to systems, apparatuses or methods having all of the features of any one embodiment or to features common to multiple or all of the embodiments described herein. A claim may include features taken from any embodiment as would be understood by one of skill in the art. The applicants, inventors or owners reserve all rights that they may have in any invention disclosed herein, for example the right to claim such an invention in a continuing or divisional application and do not intend to abandon, disclaim or dedicate to the public any such invention by its disclosure in this document.

Generally, the present disclosure provides a method and system for Transmission Control Protocol (TCP) and User Datagram Protocol (UDP) or Quick UDP Internet Connection (QUIC) traffic flow acceleration. The QUIC protocol is a low-latency Internet transportation protocol over UDP. QUIC may be used when there is a UDP link available between client and server. The system is intended to review the traffic flow and retrieve subscriber and/or IP mapping details. The system is further configured to determine BBR and New Reno method parameters to be amalgamated to provide for subscriber buffer management. The system and method detailed herein are intended to use the TCP results from BBR and New Reno to provide for UDP congestion control and acceleration as well. Further, the system and method are intended to review the subscriber buffer management details and packet loss statistics to provide for subscriber burst control for TCP and UDP traffic flows.

TCP Acceleration (TCP-A) is used by networks to provide for better throughput of traffic flows. TCP-A is intended to increase the throughput without requiring changes in end-system TCP implementations, which generally have a high capital cost. TCP-A terminates TCP connections and then relays the data to a second connection towards the User Equipment (UE). The network device housing the TCP-A system intercepts and transparently relays TCP connections inside the network. Performance improvements are intended to be from reducing the delay in the feedback loop that can trigger retransmissions.

Figure 1:
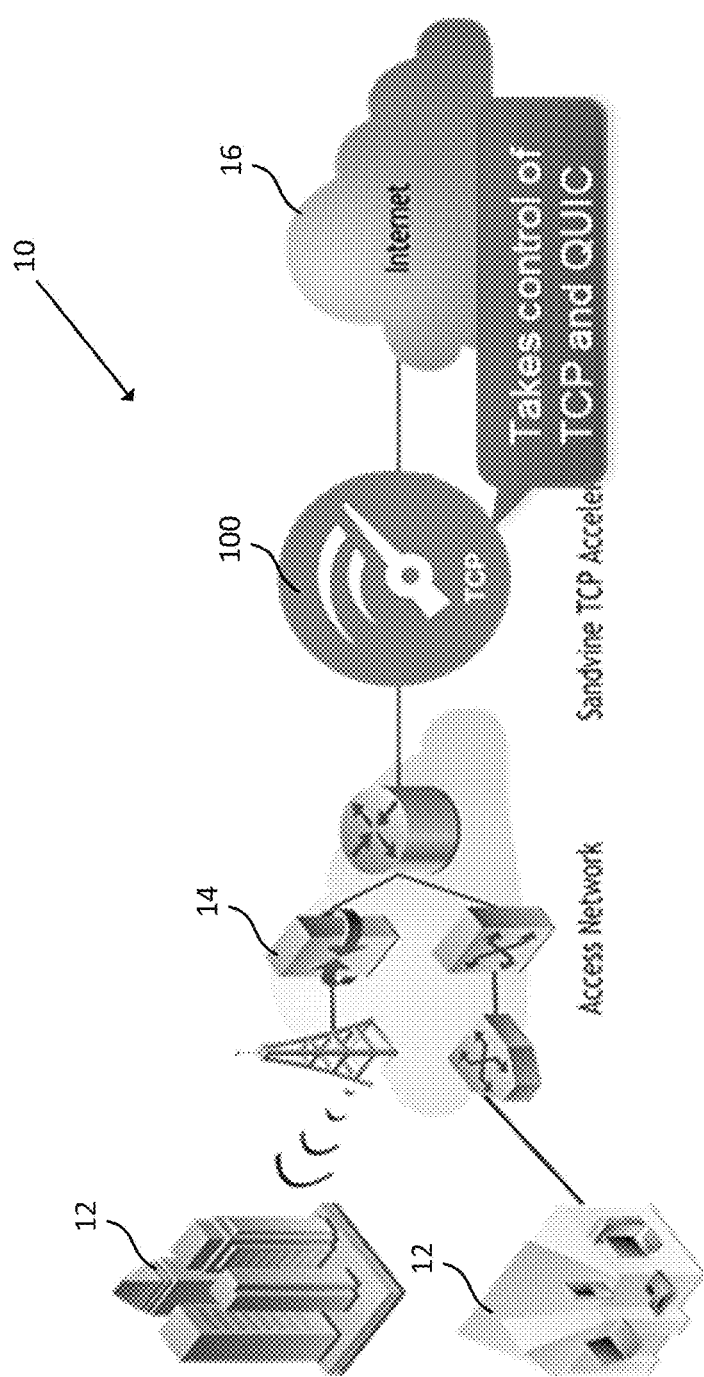
FIG. 1 illustrates a diagram of a computer network architecture including an embodiment of a system for traffic flow acceleration.

FIG. 1 shows a diagram of a computer network architecture 10 including an embodiment of a system for traffic flow acceleration 100 as described in more detail herein. It will be understood that at least subscriber 12, on a UE, accesses an Access network 14, such as a Radio Access Network (RAN). The Access network 14 is designed to allocate the network resources among the various users and the user devices 12. The system for traffic flow acceleration is intended to reside between and review connections from the access network 14 and the Internet 16. In some cases, the system will reside in the core network. The system 100 is configured to be transparent to the users. It will be understood that FIG. 1 illustrates a high level network architecture and that a computer network may include further aspects not illustrated.

A system 100 for traffic flow acceleration is intended to reside in the core network. In particular, the system 100 in intended to be in a location where the system is able to access the data noted herein for TCP and UDP traffic flows. It will be understood that in some cases the system may be a physical network device or may be a virtual networking device. It will be understood that the system may be used on any IP based networking system, for example, WiFi based, mobile data networks like GPRS, COMA, 4G, 5G, LTE, satellite based, WLAN based networks, fixed line broadband fiber optic networks as well as on virtual private networks.

When a packet of a traffic flow directed to a subscriber is received, the system is configured to determine or set a buffer size to advertise to the sender. The window size is advertised to sender and the traffic flow is configured to transmits data up to the window size before waiting for the acknowledgements. At any given time, the window advertised by the receive side of a traffic flow is intended to correspond to the amount of free receive memory it has allocated for this connection. Otherwise, the connection would risk dropping received packets due to lack of space.

The sending side is intended to allocate the same amount of memory as the receive side for good performance. That is because, even after data has been sent on the network, the sending side must hold the data in memory until the data has been acknowledged as successfully received, just in case the data would have to be retransmitted. If the receiver is far away, acknowledgments can take a long time to arrive. If the send memory is small, the memory may be saturated and block emission.

The system is intended to also interact with the User Equipment with transmissions towards a receiver, for example, a subscriber device or a UE. The system for TCP acceleration is configured to determine the 'inflight bytes'. This represents the amount of data that has been sent but not yet acknowledged by the receiver. Inflight bytes cannot be larger than the TCP receive window on the User Equipment.

There are two conventional TCP accelerator methods that are typically used by network operators. The two methods are known as Bottleneck Bandwidth and Round-trip propagation time (BBR) and New Reno that can individually decide bytes in flight.

Figure 2:
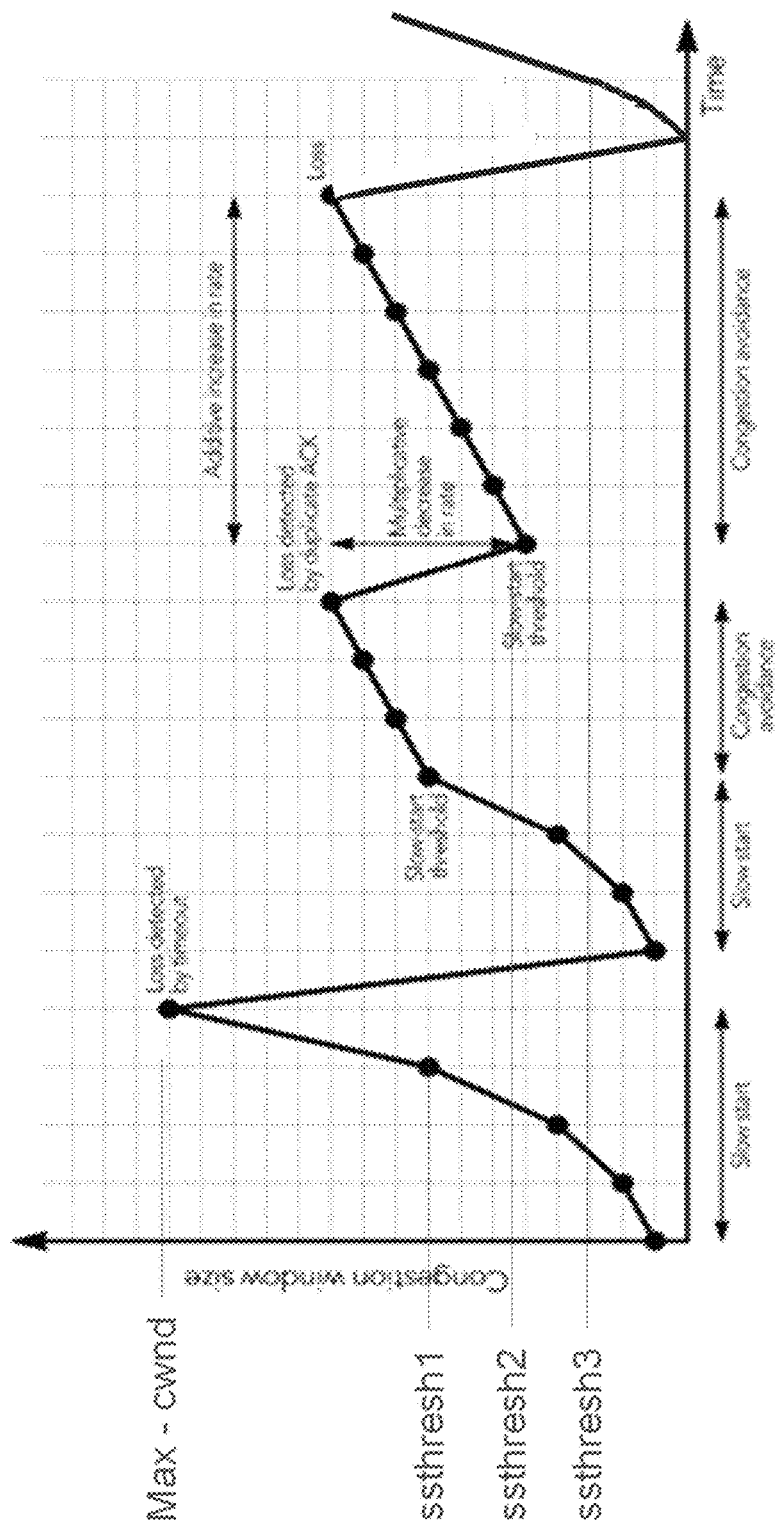
FIG. 2 illustrates the operation of an embodiment of a New Reno TCP accelerator method.

New Reno is illustrated in FIG. 2. New Reno can be considered a Loss Based congestion control mechanism. New Reno responds to packet loss by reducing window size. New Reno will increase the number of packets that are sent until New Reno determines that there is packet loss in the network. The New Reno method of congestion control includes a slow start and congestion avoidance phase.

Unfortunately, as New Reno is a Loss-based congestion control schemes the method has limitations. With shallow buffers, packet loss can happen before congestion in the network is an issue. With today's high-speed, long-haul links that use commodity switches with shallow buffers, loss-based congestion control can result in poor throughput. As such, the New Reno mechanism can overreact, halving the sending rate upon packet loss, even if the packet loss comes from transient traffic bursts. This behavior can be frequent even when the link is mostly idle and does not need to have congestion control currently applied.

Further, with deep buffers, congestion can occur before packet loss. New Reno, as a loss-based congestion control, can cause "buffer bloat" problems, by repeatedly filling the deep buffers in last-mile links and causing seconds of unnecessary queuing delay.

The system and method of traffic flow acceleration is intended to address these issues as the system and method are intended to respond to actual congestion, rather than packet loss.

Another traditional congestion method is Bottleneck Bandwidth and Round-trip propagation time (BBR). The internet has traditionally used loss-based congestion control, relying on indications of lost packets as the signal to slow down transmissions. These conventional routines have worked well in the past because internet switches and routers small buffers were well-matched to the low bandwidth of internet links. Thus, buffers tended to fill up and drop excess packets when senders began sending data too fast.

BBR congestion mechanism offers a different way of addressing network congestion. The BBR mechanism was developed by Google™. The BBR mechanism considers how fast the network is delivering data to decide how fast to send data over the network. For a given network connection, the BBR method uses recent measurements of the network's delivery rate and round-trip time to build an explicit model that includes both the maximum recent bandwidth available to that connection, and the connection's minimum recent round-trip delay. The BBR method then uses this model to control both how fast it sends data and the maximum amount of data that is allowed in the network at any time.

BBR paces packets based on RTT only. The BBR mechanism is intended to be auto calibrated and does not require any configuration of parameters.

Figure 3A:
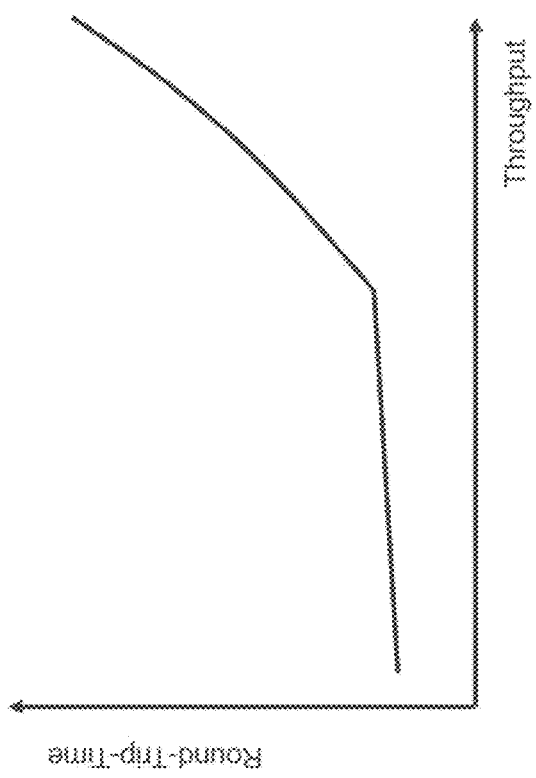
FIG. 3A illustrates typical network characteristics showing the relationship between throughput and RTT and FIG. 3B where the two algorithms BBR and New Reno typically operate in a network.
Figure 3B:
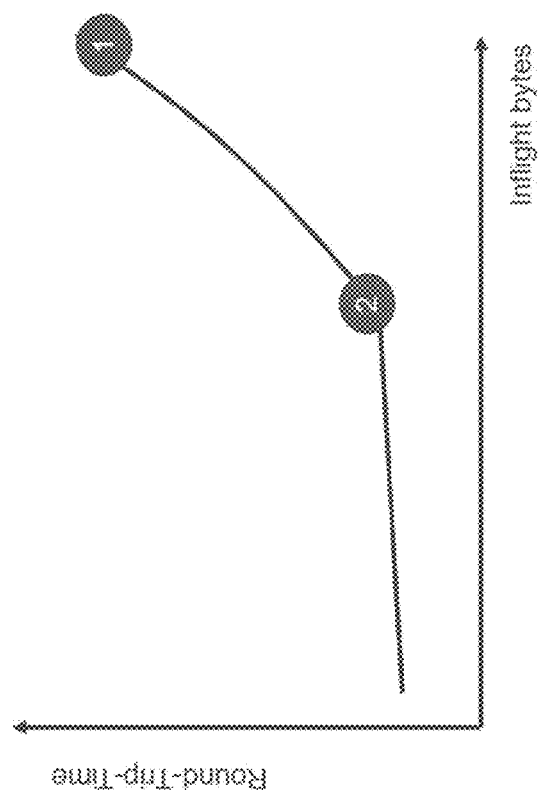

FIGS. 3A and 3B show a plot of the roundtrip time for packets vs inflight bytes. Coordinate 1 is the region in which loss-based congestion control mechanisms, like New Reno, operate. Coordinate 2 is the region where BBR method operates.

It has been found that with the current solutions there are still congestion limitations. In particular, it has been found that the BBR mechanism alone may be considered too conservative. The link will be much less loaded compared to when a network employs a New Reno method, because the bytes decided by BBR will likely be lower than that by New Reno. Hence with BBR, the network operator may not pass the speed tests and receive poor results in internet speed tests applications.

With the New Reno method, the network is intended to offer the maximum throughput possible for a flow. The New Reno method is intended to recommend a higher number of inflight bytes. If link capacity is limited, the New Reno method may offer a more optimal solution, even if the method requires manual calibration. For some operators, New Reno is an acceptable TCP Acceleration and congestion control solution. A conventional New Reno solution tends to be well understood and widely deployed as it offers a high throughput but maintains a level of congestion control.

While New Reno is aggressive, it has limitations. Mobile networks have high Round Trip Time (RTT) but are not necessarily lossy. It is likely that a New Reno congestion window (CWND) will be quite large. As such, New Reno method may exhibit flip flop behavior between congestion avoidance and slow start.

If loss increases, the New Reno method decreases the CWND. As soon as CWND decreases, less packets are sent into the network. Soon, loss decreases. Then, the New Reno method may determine that the link is not congested and will raise the CWND again. This process results in a flip flop behavior that results in fluctuating throughputs and hence poor user Quality of Experience (QoE).

New Reno alone often benefits from Flow/Subscriber Buffer management to reduce the impact of any flip flop behavior between congestion avoidance and slow start. Subscriber Buffer Management typically tempers the number of packets injected (the number of inflight bytes) at each time interval. Subscriber Buffer Management often has statically manually configurable parameters (based on Access Type of the network) to make the New Reno method less aggressive.

Conventional New Reno congestion method paces packets based on Loss only. The New Reno method does not have any way to include RTT feedback to decide the delivery rate. Moreover, the New Reno method has several parameters that generally need to be configured manually.

The system and method detailed herein is intended to provide aspects from both the New Reno and BBR mechanisms to complement each other.

Figure 4:
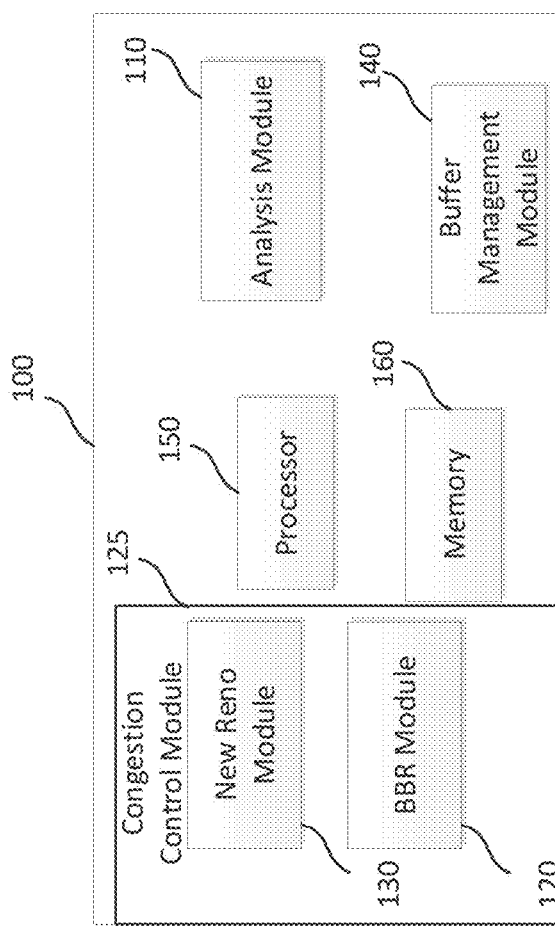
FIG. 4 illustrates a system for traffic flow acceleration according to an embodiment.

FIG. 4 illustrates a system for traffic flow acceleration. The system is intended to include an analysis module 110, a congestion control module 125, having a BBR module 120, a New Reno module 130, and a buffer management module 140 (sometimes referred to as a subscriber buffer management module), at least one processor 150 and at least one memory component 160. The system is generally intended to be distributed and reside in the data plane. A central processing unit or the control processor may be configured to execute the instructions stored in the memory component in order for the modules to execute their functions.

The analysis module 110 is configured to determine subscriber information and Internet Protocol addresses from the traffic flow. The analysis module 110 may further be configured to combine outcomes from the other module to determine subscriber burst control limits. In still other cases, the analysis module may provide other calculation aid to the other modules.

The congestion control module 125 may include the BBR module 120 and the New Reno module 130. The BBR module 120 is configured to determine delay based congestion control parameters, such as BBR parameters or other TCP, UDP or QUIC delay based congestion control parameters. The BBR module is further configured to preform BBR congestion control mechanisms or other delay based congestion control mechanisms as detailed herein. The New Reno module 130 is configured to determine loss based congestion control parameters, such as New Reno parameters or other TCP, UDP or QUIC loss based congestion control parameters. The New Reno module 130 is further configured to perform New Reno control mechanisms or other loss based congestion control mechanism as detailed herein. It will be understood that the BBR module and New Reno module may be separate and independent modules.

The buffer management module 140 is configured to determine buffer depth for subscriber burst control for TCP and UDP traffic control. In some cases, this will include Quick UDP Internet Connection (QUIC) transportation protocol which may be used over a UDP link. The subscriber buffer management module may also determine average bytes for each UDP flow as well as packet loss statistics. In some cases, the buffer management module 140 may also direct packets to the user equipment.

Figure 5:
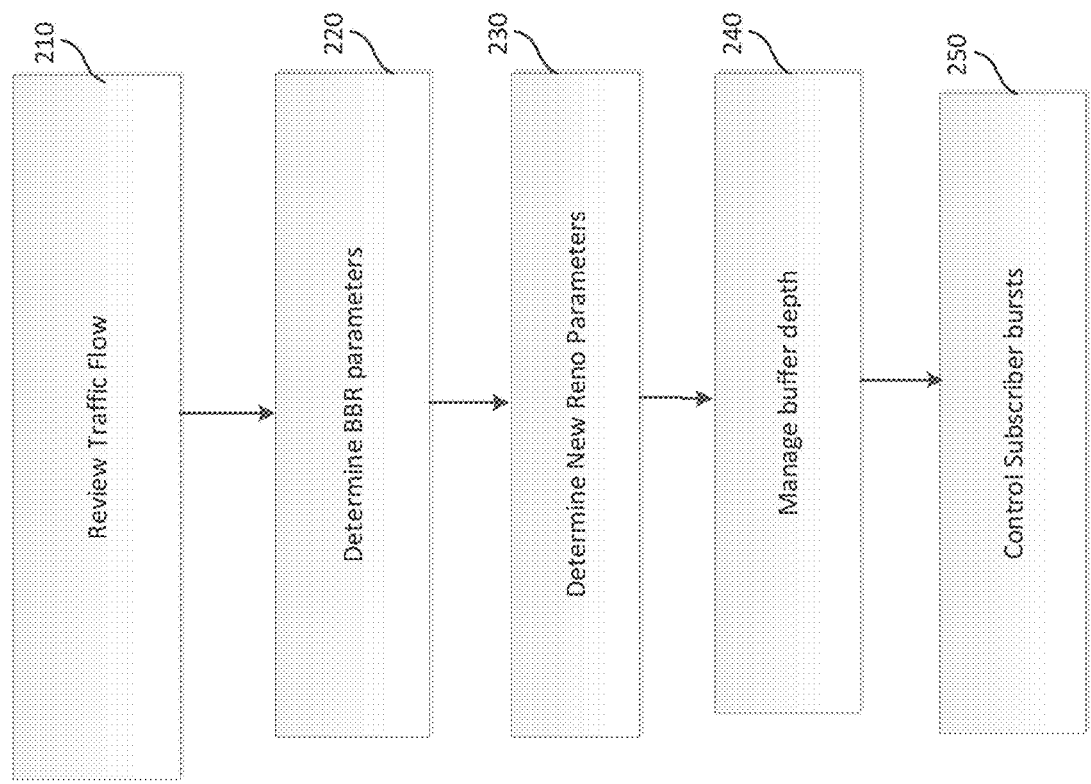
FIG. 5 is a flow chart of a method for traffic flow acceleration according to an embodiment.

FIG. 5 illustrates an overview of the method 200 for traffic flow acceleration. At 210, the system receives and reviews a traffic flow and associated IP address or subscriber details. At 220, the BBR module is configured to determine the delay based congestion control parameters such as BBR parameters associated with the traffic flow and provide BBR congestion control to the traffic flow. At 230 the New Reno module is configured to determine loss based congestion control parameters such as New Reno parameters and provide new Reno congestion control to the traffic flow. It will be understood that BBR and New Reno congestion control may be applied simultaneously.

At 240, the system is configured to determine a buffer depth based on the BBR and New Reno parameters determined by the system. At 250, the system is further configured to provide for subscriber burst control to provide congestion control for short bursts of traffic.

Embodiment of the system and method are intended to allow the network to operate at a sweet spot. Coupling the New Reno method and BBR method together allows for a mix of a Loss based mechanism and a RTT based mechanism. The BBR method and New Reno method outputs are combined to determine a Bandwidth Delay Product (BDP) value.

The system and method detailed herein are intended to combine results of the New Reno method and BRR method at, for example, a Subscriber Buffer Management layer. This layer is generally where the decision is made on how many inflight bytes to send towards the User Equipment.

Figure 6:
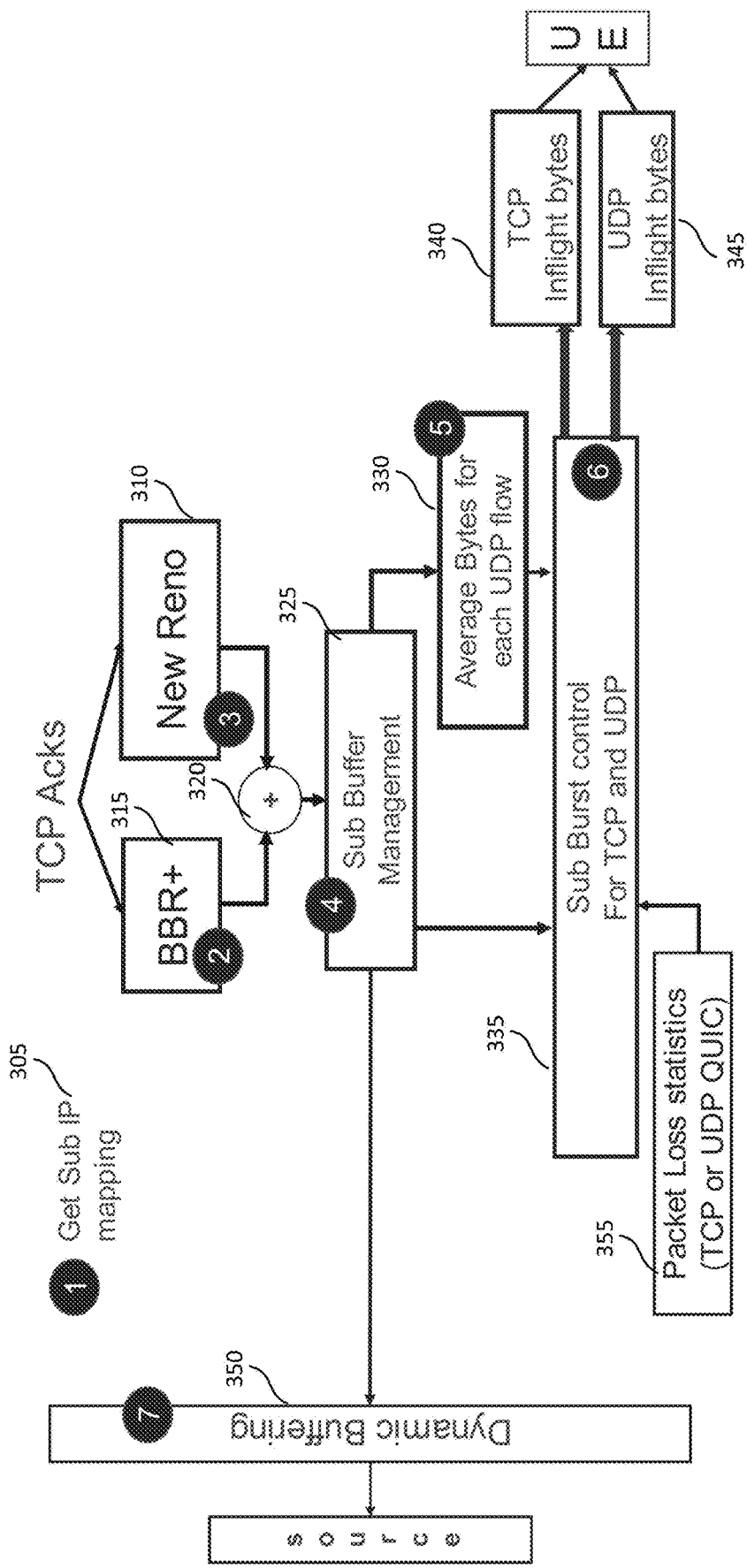
FIG. 6 illustrates the various modules and interactions for the joint TCP and UDP flow acceleration.

FIG. 6 is a flow chart illustrating a method to determine inflight bytes to be used for the subscriber buffer management. For each TCP or UDP flow, the system is configured to detect the traffic flow, at 305. The system may provide for a New Reno method, at 310, to work independent of the BBR method, at 315. In particular, per each traffic flow reviewed by the system, the analysis module is configured to detect a subscriber mapping from the control plane element OR get an IP address of the subscriber from a control plane element which is associated with the traffic flow, at 320.

A BBR module is configured to determine a BDP per subscriber (or per IP address) within the system. The BBR module determines how many inflight bytes to send based on the BBR module or analysis module determination of an associated RTT. RTT may be determined from, for example, TCP-ACKs. The output of the BBR module is a BDP value wherein the units of BDP is bytes. The Bandwidth Delay Product (BDP) determines the amount of data that can be in transit in the network. BDP represents the number of bytes per subscriber (or IP address) that can be sent downstream, for an acceptable RTT. BDP represents Bits of data in transit between hosts and may be determined by: BDP (bits)= Measured Throughput (bits/sec)×RTT, where RTT is the round-trip time for the path in seconds.

The New Reno module is configured to be operational at the same time as the BBR module. The New Reno module is configured to use TCP-ACKs to determine packet loss. The output of New Reno is also a BDP value, which can be determined, for example, as follows: For each subscriber (or IP address), the number of TCP or UDP Bytes that can be kept in flight (without ACK being received) is equal to the CWND multiplied by number of bytes sent, as measured, in the previous interval to the subscriber. The analysis module of the system may be configured to count or otherwise measure the bytes sent and each interval including a previous interval. It is intended that the minimum length of each interval be similar to a round trip time of the traffic. It may be preferable to have the interval be between two and four times the round-trip time duration, although other interval timings may be used. The interval time should be sufficient as to not be overly influenced by noise.

The New Reno module is configured to determine the congestion window (CWND) per subscriber (or IP address), wherein the units of the CWND is packets. The congestion window indicates the maximum amount of data that can be sent out on a flow without being acknowledged. It is intended that the operation of the New Reno method is not altered by the New Reno module, however the outcome of the CWND may be used by other modules in the system.

The analysis module is configured to combine the BBR module outputs with the New Reno module outputs and feed this data to the subscriber buffer management module or subscriber buffer management layer, at 325. The buffer depth to advertise is determined as detailed herein.

For TCP, within the system, and in particular the buffer management module, is configured to combine New Reno and BBR for TCP to decide inflight bytes. The system is intended to operate at a point between BBR and New Reno, for example, a midpoint, an average, a weighted average between BBR and New Reno, or the like. In a specific example the Inflight TCP bytes per subscriber (or IP address) may be the weighted average of the BBR module output and the New Reno module output. In a specific example, for mobile networks where one would want to maximize spectral efficiency, the weighting would be more towards the New Reno method.

The weighting of the average may depend on the operator and the traffic variations experienced on the network. In some cases, the network may not be compatible with the set weights of New Reno and BBR may be preferred to be weighted more highly in the combination. In other cases, the network may allow for aggressive traffic flow management options provided by the New Reno method and New Reno may be weighted more aggressively. It, will be understood that the weightings may change over time and when traffic patterns and different traffic variations are noted by the operator and/or by the system.

After the Inflight TCP bytes are received by the system, they may be used for various purposes prior to being forwarded to the UE. The buffer management module may use the Inflight TCP bytes per subscriber to determine the UDP inflight bytes, at 330.

At 335, the Inflight TCP bytes are further intended to be used for Subscriber Burst control as detailed herein. Once the subscriber buffer management module has completed the processing, the packets can be sent off to the UE, for either the TCP flows, at 340, and/or UDP flows, at 345. The subscriber buffer management module will also determine a number of packets to advertise towards the sender for dynamic buffering, at 350.

To determine the inflight bites towards the UE for UDP by the system, the subscriber buffer management module is configured to reuse the TCP inflight byte outcomes. In particular, the system is configured to receive acknowledgement (ACKs) for TCP and use the ACKs as an indicator of the congestion experienced by the various flows, including UDP, for that subscriber. For UDP traffic, the outputs of TCP inflight bytes determination are used to infer the inflight bytes towards the UE.

For UDP, the UDP delivery rates are changed based on TCP determinations. It is intended that the system be used for UDP to take the average of the BDP values for all the TCP flows—for the specific subscriber. That same value will be applied to QUIC flows for that subscriber, at 355.

UDP Subscriber based Buffer management uses inputs from TCP congestion control. UDP Subscriber Burst control is configured to determine a maximum burst size for flows over short interval, as detailed herein. In some cases, the duration of the short interval would be in the range of tens to a few hundreds of microseconds (μs). The range is intended to be sufficiently responsive without being unduly sensitive to noise.

It will be understood that the TCP inflight byte outputs from the New Reno module and the BBR module may be combined to determine UDP inflight bytes. For UDP subscriber buffer management, subscriber or IP info is retrieved from a memory component associated with the analysis module. For each subscriber: determine, for example, the sum of inflight bytes for each of the TCP flows for that subscriber. This sum may be across all the flows for that subscriber.

Further, the Average Bytes for each UDP flow (for a given subscriber) is determined and is intended to equal the subscriber burst control/the number of TCP flows for that subscriber.

The subscriber buffer management module may further provide for subscriber burst control prior to sending the inflight packets to the UE. Subscriber burst control for either TCP and/or UDP are common. Subscriber burst control is intended to determine a maximum burst size for flows over short intervals. The burst control may generate a quota over short intervals, for example, 50 μs. The burst size is decided by packet loss statistics, based on how many ACKs are lost over short periods. In some cases, the range of lost ACKs may be between 2 and 4 ACK packets in order to change the burst control interval.

Figure 7:
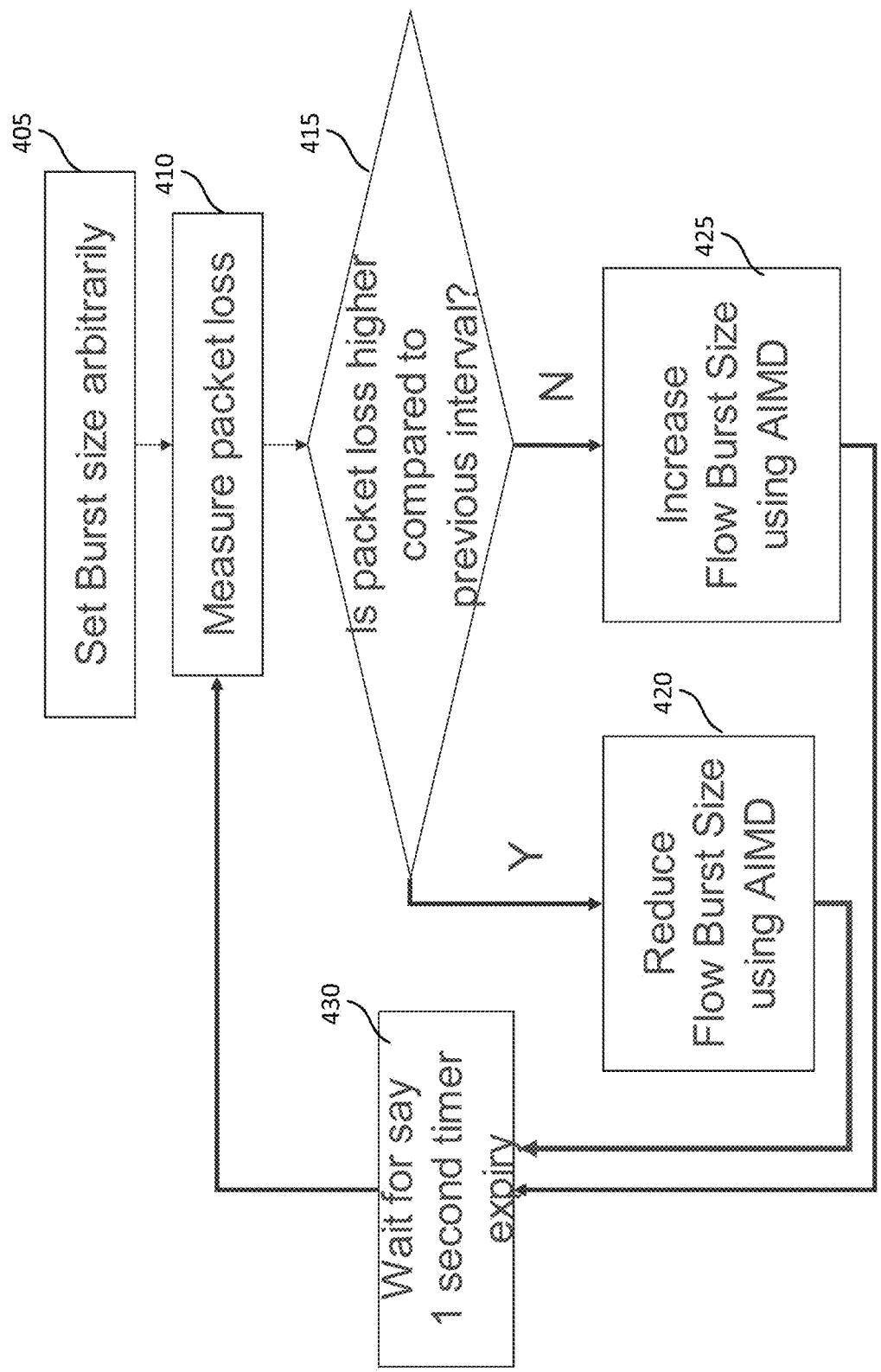
FIG. 7 illustrates a method for Subscriber Burst control according to an embodiment.

FIG. 7 illustrates a method for subscriber burst control. It will be understood that buffer management, provided by the subscriber buffer management module is intended to provide congestion control to traffic burst over longer durations. However, over shorter periods, excessively high bursts may occur. These bursts are intended to be kept to an acceptable limit without dumping a sizable number of packets into the network for short intervals. As such, the system and method detailed herein are intended to provide for burst control during traffic flow acceleration.

Without burst control, the system and method provided herein could potentially send high burst of traffic in a short time. Intermediate routers could drop those packets, resulting in substantial loss in a short period of time and hence lowered throughput for a subscriber. ACK sequences are consecutive segments of packets and if there is packet loss it can be measured by the system. Thus, packet loss statistics can be used to decide the highest bursts that can be sent through the system without resulting in lower throughput.

With subscriber burst control, buffer space is freed up based on the subscriber bursts allowed. No separate memory is intended to be needed. However, for provisioning purposes, memory for the worst case may need to be allocated by the system as detailed herein.

Conventionally, the burst control parameters tended to be manually configured. Embodiments of the system and method are intended to determine measurements of Packet Loss statistics to determine the highest burst of packets in a short time that can be applied by the Flow Burst Control.

The system may initialize a burst size arbitrarily, at 405, for example, may set the burst size based on the RTT buffer size. The system may then measure packet loss of the subscriber, at 410. The analysis module may determine whether the packet loss is higher than the previous interval, at 415. If the packet loss for a flow is higher, the Burst size may be reduced, at 420. If packet loss is lower (than the previous interval), the Burst size may be increased at 425. The buffer management module is configured to use the burst size determined by the analysis module to modify the traffic flow to the subscriber.

In a particular example, if 1 packet loss over short period, then size of Burst Control buffer may be reduced to 80% of RTT buffer, while if 2 packet loss over short period, then size of Burst Control buffer may be reduced to 60% of RTT buffer, and the like. In another example, AIMD (Additive Increase, Multiplicative Decrease) may be used to change the burst buffer size.

The amended burst size may be configured at various intervals, for example, every 5 micro-second, every 10 microseconds, every 100 microseconds or the like, at 430. Alternatively, the system may use application awareness to decide the frequency of responding to packet loss. For certain applications that may be more sensitive to packet loss, for example, real time gaming, an amended burst size may be configurable to every 1 or 2 microseconds. For applications less sensitive to packet loss, the amended burst size may be configurable to longer durations.

Once a burst size is determined, the burst control may be used to decide how many bytes to release towards the UE, (in-flight bytes) based on received ACKs. Any further packets may be held until further ACKs are received.

If ACKS are not received, then the BBR module and the New Reno module will independently redetermined a number of inflight bytes that may be released at a given time. The burst control may be applied individually to TCP flows and to UDP flows. Once the inflight bytes for TCP and UDP are determined, the bytes may be released towards the UE.

The determination of the subscriber buffer management module is intended to provide for dynamic buffering and provide a packet size to advertise to the sender and hence decide how much to buffer. In some cases, a dynamic buffer depth may use Inputs from the TCP BBR (BDP=max delivery rate×mean RTT BDP). This may be used to advertise window size every time there is a change in buffer length, as determined above.

Alternatively, the decision of when to send the buffer length could be done by piggy backing with an Ack. The buffer length could be added as an extension to the ack packet. The client TPC protocol stack would ben parse out the buffer length from the ack. While this would not be considered a standard procedure, it would provide the benefit of ensuring the client is receiving buffer length messages accurately and when they are needed.

As is usual operation for traffic flow acceleration, pre-acks are sent to the sender in order to increase the traffic flow from the sender to the system and method prior to sending the packets to the UE. The purpose of providing for pre-acks is intended to ensure that the sender continues to send sufficiently packets to the system so that these packets can be made available to the client when congestion is low. The system in addition with TCP acceleration is intended to maximize the throughput while reduce the round trip time between the client and sender (as the ground trip time is now shortened to between the system and the client).

Figure 8:
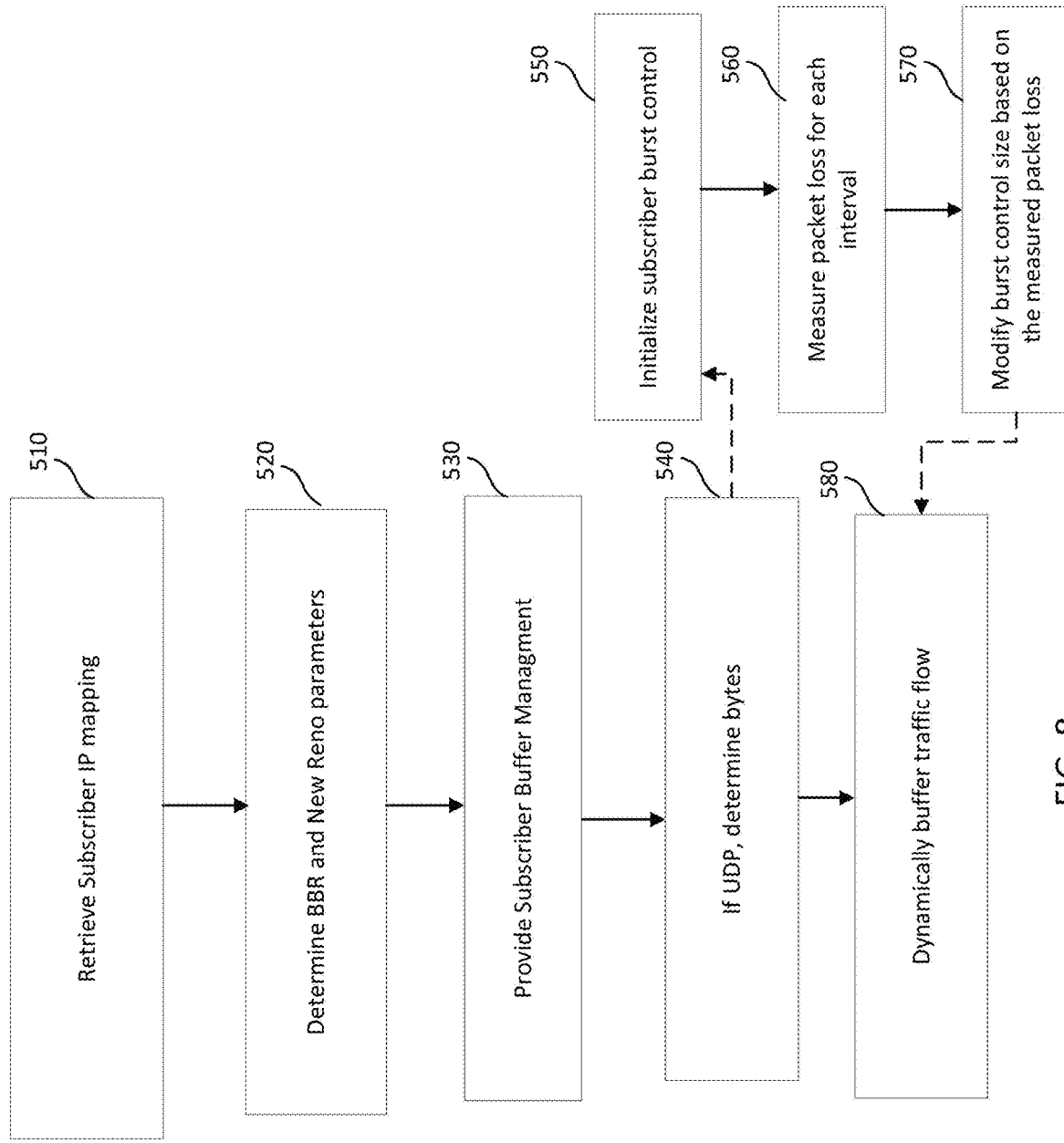
FIG. 8 is a flow chart for a method for traffic flow acceleration according to an embodiment.

FIG. 8 illustrates a more detailed method for traffic flow acceleration. At 510, the analysis module is configured to detect a subscriber mapping from a control plane element for each traffic flow reviewed by the system. In other cases, the analysis module may retrieve an IP address of the subscriber from a control plane element which is associated with the traffic flow. At 520, the BBR module and New Reno module are configured to retrieve the appropriate parameters to begin traffic congestion control management.

The analysis module is configured to combine the BBR module outputs with the New Reno module outputs and feed this data to the subscriber buffer management module or subscriber buffer management layer, at 530. It is intended that the subscriber buffer management provides awareness into the congestion levels of the network and the buffer management at a client to provide an appropriate stream of traffic between the TCP-Accelerator system and the client. At 540, it is determined if the flow is a UDP flow and if so, the inflight bytes of the UDP flow may be determined and subject to the traffic flow acceleration method detailed herein.

Optionally, the system may further be configured to provide for subscriber burst control as illustrated by the dashed arrows. At 550, the subscriber burst control counter may be initialized to a predetermined starting threshold. During each short interval, an interval within a few hundred microseconds, the system is intended to measure packet loss, at 560. If the packet loss is greater than the previous interval the flow burst size may be reduced and if the packet loss is less, the flow burst size may be increased, at 570.

At 580, the system is intended to buffer the traffic in view of the burst control and the subscriber buffer awareness and the congestion control mechanism parameters.

The benefit of combining BRR and New Reno together provides for a system that allows maximal utilization of the link capacity with the benefit of automatically detecting thresholds at which the link is congested. Combining the methods provides for overall better usage of the network and provides for flexibility by weighting each method when the traffic variation or network operator's parameters are changed or updated.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for traffic flow acceleration in a computer network, the method comprising:
   retrieving a Transmission Control Protocol (TCP), User Datagram Protocol (UDP) or Quick UDP Internet Connection (QUIC) traffic flow from the computer network;
   mapping the traffic flow to a subscriber on the computer network;
   determining congestion control parameters associated with the traffic flow;
   determining subscriber buffer management parameters based on the subscriber and the congestion control parameters;
   managing a buffer depth at a subscriber level based on the subscriber buffer management parameters; and
   controlling subscriber burst activities based on Round Trip Time buffer size to control congestion, wherein controlling subscriber burst activities comprises:
   initializing a burst size for the subscriber;
   measuring packet loss over a predetermined interval for the subscriber;
   comparing the packet loss during the predetermined interval with the previous interval packet loss; and
   adjusting the burst size for the subscriber based on the comparison, wherein the flow burst size is reduced if the packet loss is higher in the current interval and increased if the packet loss is less in the current interval.

2. The method according to claim 1 wherein the predetermined interval is in a range of hundreds of microseconds.

3. The method of claim 1 wherein the congestion control parameters comprise:
   determining Bottleneck Bandwidth and Round-trip propagation time (BBR) parameters or delay based congestion control parameters; and
   determining New Reno congestion mechanism parameters or loss based congestion control parameters.

4. The method of claim 3 wherein managing buffer depth comprises combining a weighted average of BBR parameters and New Reno parameters.

5. The method of claim 4 wherein the BBR parameters and New Reno parameters are incorporated based on the traffic variations on the computer network.

6. The method of claim 4 wherein the BBR parameters and New Reno parameters are incorporated based on the traffic control desired by the network operator.

7. A system for traffic flow acceleration in a computer network, the system comprising:
   a processor;
   a memory comprising computer readable code, wherein the computer readable code, when executed by the processor, implements modules comprising:
   an analysis module configured to retrieve a Transmission Control Protocol (TCP), User Datagram Protocol (UDP) or Quick UDP Internet Connection (QUIC) traffic flow from the computer network and map the traffic flow to a subscriber on the computer network;

a congestion control module configured to determine congestion control parameters associated with the traffic flow; and a buffer management module configured to determine subscriber buffer management parameters based on the subscriber and the congestion control parameters; and manage a buffer depth at a subscriber level based on the subscriber buffer management parameters and to control subscriber burst activities based on Round Trip Time buffer size to control congestion, wherein controlling subscriber burst activities comprises:

initializing a burst size for the subscriber;

measuring packet loss over a predetermined interval for the subscriber;

comparing the packet loss during the predetermined interval with the previous interval packet loss; and adjusting the burst size for the subscriber based on the comparison, wherein the flow burst size is reduced if the packet loss is higher in the current interval and increased if the packet loss is less in the current interval.

8. The system according to claim 7 wherein the predetermined short interval is in a range of hundreds of microseconds.

9. The system of claim 7 wherein the congestion control module comprises:

a Bottleneck Bandwidth and Round-trip propagation time (BBR) module configured to determine BBR parameters or delay based congestion control parameters; and a New Reno module configured to determine New Reno congestion mechanism parameters or loss based TCP congestion control parameters.

10. The system of claim 9 wherein the buffer management module is configured to combine a weighted average of BBR parameters and New Reno parameters.

11. The system of claim 10 wherein the BBR parameters and New Reno parameters are incorporated based on the traffic variations on the computer network.

12. The system of claim 10 wherein the BBR parameters and New Reno parameters are incorporated based on the traffic control desired by the network operator.

* * * * *